(12) United States Patent
Che et al.

(10) Patent No.: US 7,713,465 B2
(45) Date of Patent: May 11, 2010

(54) METHOD OF PRODUCING MNZN-BASE FERRITE

(75) Inventors: Shenglei Che, Tokyo (JP); Kentaro Mori, Tokyo (JP); Masahiko Watanabe, Tokyo (JP); Takuya Aoki, Tokyo (JP); Tomofumi Kuroda, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/053,082

(22) Filed: Mar. 21, 2008

(65) Prior Publication Data
US 2008/0236706 A1  Oct. 2, 2008

(30) Foreign Application Priority Data
Mar. 30, 2007  (JP) .............................. 2007-091611

(51) Int. Cl.
*C04B 33/32*  (2006.01)
(52) U.S. Cl. .................. 264/613; 501/104; 501/112
(58) Field of Classification Search ................. 264/611, 264/613; 501/104, 112, 121
See application file for complete search history.

(56) References Cited

U.S. PATENT DOCUMENTS

| | | | | |
|---|---|---|---|---|
| 3,846,322 | A | * | 11/1974 | Sugimoto et al. ............... 117/2 |
| 5,039,464 | A | * | 8/1991 | Wank et al. .................... 264/82 |
| 2003/0042470 | A1 | * | 3/2003 | Ishida et al. ................. 252/500 |
| 2006/0118756 | A1 | * | 6/2006 | Takagawa et al. ......... 252/62.62 |

FOREIGN PATENT DOCUMENTS

| EP | 519484 A2 * | 12/1992 |
|---|---|---|
| JP | 06267726 | 9/1994 |
| JP | 3707781 | 8/2005 |

* cited by examiner

*Primary Examiner*—Eric Hug
*Assistant Examiner*—Erin Snelting
(74) *Attorney, Agent, or Firm*—Oblon, Spivak, McClelland, Maier & Neustadt, L.L.P.

(57) ABSTRACT

Provided is a process for producing a MnZn-base ferrite comprising: firing a compacted raw material to produce the MnZn-base ferrite, wherein the firing comprises, in the following order: a heating phase comprising gradually bringing a firing temperature from room temperature up to a maximum temperature; a maximum temperature holding phase comprising maintaining the maximum temperature for a period of time, wherein a partial pressure of oxygen (p2) at the maximum temperature holding phase is greater than an equilibrium partial pressure of oxygen (p1) as follows: p2>p1, wherein the equilibrium partial pressure of oxygen (p1) is represented by the following equation: $\log(p1)=\log(PO_2)=a-b/T$, wherein $PO_2$ is measured in a unit of %, and T is measured in a unit of absolute temperature K; and a cooling phase comprising gradually bringing the maximum temperature down to near room temperature, wherein a partial pressure of oxygen (p3) at the cooling phase is operated at an equilibrium partial pressure of oxygen based on the equation $\log(p3)=a-b/T$.

20 Claims, No Drawings

METHOD OF PRODUCING MNZN-BASE FERRITE

BACKGROUND OF THE INVENTION

1. Field of the Invention

The present invention relates to a process for the production of MnZn-base ferrites capable of making sure high saturation flux densities, minimized or limited core losses, and a well-balanced property between both saturation flux density and core loss.

2. Explanation of the Prior Art

In recent years, electronic equipment has seen rapid progresses in size reductions and high outputs. With this, there are progresses in the high integration and fast operation of various parts, and power source lines for power supply are required to have large currents, too. Parts such as transformers and choke coils are also required to be driven on large powers. In consideration of temperature rises due to the generation of heat upon driving, there are mounting demands on stable and reliable driving at high temperatures.

To meet such demands, ferrite materials that constitute transformers and choke coils are now required to have low core loss and high saturation flux density at operating temperatures.

High saturation flux densities require an increase in the amount of Fe in ferrites. However, increasing the amount of Fe leads to increased core losses; in general, only adjustments of ferrite-constituting compositions result in the inability to obtain sensible tradeoffs between both properties: high saturation flux density and low core loss.

For this reason, there are some methods tried in the art, wherein a ferrite material is composed of $Fe_2O_3$, MnO and ZnO as main ingredients with additives suitably selected from Si, Ca, Zr, Nb, Ta, V, Bi, Mo, Sn or the like added to the main ingredients, and the firing conditions for a process of firing the ferrite material are adjusted to obtain good properties: high saturation flux density and low core loss (for instance, see JP(A)6-267726 and Japanese Patent No. 3707781).

Generally in the ferrite material firing process, the partial pressure of oxygen ($PO_2$) in a firing atmosphere at a high-temperature holding operation step (sintering temperature-holding step) and a cooling operation step (cooling process step) is determined and operated on the basis of an equilibrium relation equation in relation to temperature.

That is, for the operation of the partial pressure of oxygen and temperature, there is the following equilibrium relation equation (1) indicative of an equilibrium relation between the partial pressure of oxygen ($PO_2$ in %) and the temperature (T in absolute temperature K), and an actual operation relation equation for the partial pressure of oxygen and the temperature is obtained by fixing the values of a and b.

$$Log(PO_2)=a-b/T \qquad \text{Eq. (1)}$$

And in the prior art, once the optimum operation relation equation on the basis of the aforesaid equation (1) has been fixed, the firing operation from the high-temperature holding operation step (sintering-temperature holding step) to the cooling operation step (cooling process step) is fixed by the partial pressure of oxygen and temperature based on that operation relation equation, and kept going on.

However, there is no end to the demand on well-balanced properties between high saturation flux density and low core loss; there is an improved MnZn-base ferrite production process still in great demand.

The situation being like such, the invention has been made for the purpose of providing a MnZn-base ferrite production process that enables high saturation flux density to be achieved with low core loss or has a well-balanced property tradeoff between saturation flux density and core loss.

SUMMARY OF THE INVENTION

According to the invention, the aforesaid object is accomplishable by the provision of a MnZn-base ferrite production process comprising a firing step for firing a compact into a ferrite, wherein said firing step comprises a heating operation phase, a high-temperature holding operation phase and a cooling operation phase in order; said heating operation phase is an operation area for bringing a firing temperature from room temperature gradually up to the highest temperature; said high-temperature holding operation phase is an operation area for allowing the reached highest temperature to remain held for a given time; said cooling operation phase is an operation area for bringing the reached highest temperature gradually down to near room temperature; for operation of a partial pressure of oxygen and temperature at said high-temperature holding operation phase and said cooling operation phase, the following equilibrium relation equation (1) indicative of an equilibrium relation of a partial pressure of oxygen ($PO_2$ in %) to a temperature (T in absolute temperature K) is used to set the values of a and b at given values of a=a* and b=b*, respectively, $$Log(PO_2)=a-b/T \qquad \text{Eq. (1)}$$

and $Log(PO_2)=a^*-b^*/T$ that is a basic relation equation for operation of the partial pressure oxygen ($PO_2$) and temperature (T) is fixed as an basic equation for operation; the partial pressure of oxygen ($PO_2$) at said high-temperature holding operation phase is operated at a partial pressure of oxygen p2 that is higher than a value of an equilibrium partial pressure of oxygen $PO_2$=p1 determined from an equilibrium relation to temperature based on the basic equation for operation Log $(PO_2)=a^*-b^*/T$: p2>p1; and the partial pressure of oxygen ($PO_2$) at said cooling operation phase is operated at an equilibrium partial pressure of oxygen determined from an equilibrium relation to temperature based on the basic equation $Log(PO_2)=a^*-b^*/T$.

In a preferable embodiment of the invention, said basic equation for operation $Log(PO_2)=a^*-b^*/T$ is derived by a first step of fixing as the value of b one value b* chosen from the range of 8,000 to 18,000; a second step where, on the assumption that as the value of a is fixed, it permits the relation of temperature to the partial pressure of oxygen to be found from equilibrium relation equation (1), the value of a is varied between the numerical values of 3 and 14 at n points (where n is an integer ranging from 2 to 20) to figure out n equilibrium relation equations indicative of equilibrium relations of temperature to the partial pressure of oxygen corresponding to individual values a1, a2, a3, . . . , an; a third step where in said n equilibrium relation equations, a temperature at the high-temperature holding operation phase and a decreasing temperature at the cooling operation phase are defined to find equilibrium partial pressures of oxygen corresponding to the operation of temperature at the high-temperature holding operation phase and cooling operation phase based on the n equilibrium relation equations (1); and a fourth step where preliminary experimentation is carried out to fire ferrites under said n conditions to find a=am (where m is one chosen from m=1 to n) at which the ferrite is judged to have primarily an excellent saturation flux density property Bs, thereby fixing this am as a*.

In a preferable embodiment of the invention, the partial pressure of oxygen ($PO_2$) at said high-temperature holding operation phase is operated at a partial pressure of oxygen p2 that is higher than the value of an equilibrium partial pressure of oxygen $PO_2=p1$ determined from an equilibrium relation to temperature based on the basic equation for operation $Log(PO_2)=a*-b*/T$: $p2>p1$, and the value of p2/p1 is in the range of 1.1 to 5.0.

In a preferably embodiment of the invention, one value b* chosen from the range of 10,000 to 14,000 is fixed as the value of b, and the value of a is varied between the numerical values of 4 to 10 at n points.

In a preferable embodiment of the invention, at the cooling operation phase, the atmosphere is changed over to a nitrogen atmosphere from a temperature chosen from the range of 1,100 down to 900° C.

According to a preferable embodiment of the invention, in the temperature range of 1,000 down to 800° C. at the cooling operation phase, the cooling rate is operated at a rate greater than 200° C./hr.

In a preferable embodiment of the invention, the ferrite contains as main ingredients an iron oxide in an amount of 55 to 61.5 mol % as calculated on a $Fe_2O_3$ basis and a zinc oxide in an amount of 4 to 15 mo % as calculated on a ZnO basis, with the balance being a manganese oxide (MnO).

In a preferable embodiment of the invention, the ferrite contains as a further main ingredient a nickel oxide in an amount of 2.5 to 7.5 mol % as calculated on a NiO basis.

In a preferable embodiment of the invention, the ferrite contains as a further main ingredient a lithium oxide in an amount of 0.5 to 2.0 mol % as calculated on a $LiO_{0.5}$ basis.

In a preferable embodiment of the invention, the ferrite contains as subordinate ingredients at least one element selected from the group consisting of Si, Ca, Zr, Nb, Ta, V, Bi, Mo, and Sn.

EXPLANATION OF THE PREFERRED EMBODIMENTS

The MnZn-base ferrite production process according to the invention is now explained in greater details.

First of all, reference is made to the MnZn-base ferrite to be produced by the invention.

[Explanation of the MnZn-Base Ferrite to be Produced by the Invention]

The MnZn-base ferrite to be produced by the invention contains as main ingredients, and is made up of, an iron oxide in an amount of 55 to 61.5 mol %, preferably 55 to 59 mol % as calculated on a $Fe_2O_3$ basis and a zinc oxide in an amount of 4 to 15 mol %, preferably 5 to 10 mol % as calculated on a ZnO basis, with the balance being a manganese oxide (MnO).

Further, the MnZn-base ferrite may contain as a main ingredient a nickel oxide in an amount of 2.5 to 7.5 mol %, preferably 3 to 6 mol % as calculated on a NiO basis.

Yet further, the MnZn-base ferrite may contain as a main ingredient a lithium oxide in an amount of 0.5 to 2.0 mol %, preferably 1.0 to 1.5 mol % as calculated on a $LiO_{0.5}$ basis.

In the aforesaid composition range, as the amount of $Fe_2O_3$ is below 55 mol %, it will tend to cause inconvenience that any desired high saturation flux density is not obtained. As the amount of $Fe_2O_3$ exceeds 61.5 mol %, on the other hand, it will tend to give rise to increased core losses, resulting in inconvenience that any desired low core losses are not obtained.

As the amount of ZnO is below 4 mol %, it will tend to cause a drop of the so-called relative density, making it difficult to achieve low core losses. As the amount of ZnO exceeds 15 mol %, on the other hand, it will tend to give rise to a drop of Curie temperature, resulting in inconvenience that saturation flux densities decrease at high temperature.

By the incorporation of NiO in the amount of 2.5 to 7.5 mol %, it is likely that MnZn-base ferrites well balanced in terms of both high saturation flux density and low core loss are easily achievable.

By the incorporation of $LiO_{0.5}$ in the amount of 0.5 to 2.0 mol %, it is likely that MnZn-base ferrites well balanced in terms of both high saturation flux density and low core loss are easily achievable.

The MnZn-base ferrite to be produced by the invention may contain as subordinate ingredients at least one element selected from the group consisting of Si, Ca, Zr, Nb, Ta, V, Bi, Mo, and Sn in the following preferred amounts in wt %.

$SiO_2$: 0.005 to 0.03 wt %
CaO: 0.008 to 0.17 wt %
$Nb_2O_3$: 0.005 to 0.03 wt %
$Ta_2O_5$: 0.01 to 0.1 wt %
$V_2O_5$: 0.01 to 0.1 wt %
$ZrO_2$: 0.005 to 0.03 wt %
$Bi_2O_3$: 0.005 to 0.04 wt %
$MoO_3$: 0.005 to 0.04 wt %

Of these, particular preference is given to silicon oxide, calcium oxide, niobium oxide, and zirconium oxide.

The inventive MnZn-base ferrite production process is now explained.

[Explanation of the MnZn-Base Ferrite Production Process]

The MnZn-base ferrite production process of the invention may be carried out as in the prior art with the exception that the firing step involved is different from prior art ones. That is, process steps up to the firing step, viz., up to the step of forming the compact of raw material powders may be carried out as in conventional MnZn-base ferrite production processes.

For instance, the process steps up to the firing step may include the following steps (1) to (4).

(1) Step of Weighing the Raw Materials in Such a Way as to have the Predetermined Metal Ion Ratio, Thereby Obtaining the End Ferrite Product.

For the raw materials for the main ingredients, use is made of a powdery form of oxides or compounds that turn into oxides by heating, for instance, carbonates, hydroxides, oxalates, and nitrates. Each raw powder may have an average particle size lying appropriately in the range of about 0.1 to 3.0 cm. Note here that powders of a composite oxide containing two or more metals may be used for the raw materials. The respective starting powders are weighed in such a way as to have the given compositions.

(2) Calcination Step Carried Out after the Weighed Materials are Mixed Wet or Dry The staring powders are mixed wet in, for instance, a ball mill, dried, pulverized, and sieved out. Thereafter, calcination is carried out to hold the product at a temperature in the range of 700 to 1,000° C. for a given time. The calcination may as well be carried out in nitrogen or the atmosphere for a holding time optionally chosen from the range of 1 to 5 hours.

(3) Pulverization Step for the Calcined Powders

After calcination, the product is pulverized to an average particle size of the order of 0.5 to 5.0 μm.

It is noted that the timing when the raw powders are to be added is not limited to the aforesaid one. For instance, powders of only some ingredients may be weighed, mixed, calcined, and pulverized. And the raw powders for other ingredients in the given amounts are added to and mixed with the powders of the main ingredients obtained after calcination and pulverization.

(4) Granulation and Compaction Step

The pulverized powders are granulated into granules for the purpose of making the next compaction step smooth. Preferably in this case, a suitable binder such as polyvinyl alcohol (PVA) in a small amount is added to the pulverized powders. The obtained granules have preferably a particle size of about 80 to 200 μm. The granules are compacted under pressure into a compact of, for instance, toroidal shape.

The firing step—part of the invention—for firing the compact into a ferrite product is now explained in further details.

[Explanation of the Firing Step]

The firing step comprises a heating operation phase, a high-temperature holding operation phase, and a cooling operation phase in this order.

The heating operation phase is an operating area where the firing temperature is gradually brought from room temperature up to the highest temperature. The high-temperature holding phase is an operating area where the reached highest temperature remains held stably for the predetermined time. The cooling operation phase is an operating area where the reached highest temperature is gradually brought down to near room temperature. The "near room temperature" here is understood to refer to a temperature range of 0 to 300%.

One each phase is now explained at great length.

(Heating Operation Phase)

Preferably at the heating operation phase, operation is carried out such that the concentration of oxygen (partial pressure of oxygen) in the atmosphere is regulated to up to 10%, preferably up to 3% in the temperature range of preferably 900° C. (more preferably 600° C.) to the high-temperature holding operation phase. The heating rate is 50 to 300° C./hr, more preferably 50 to 150° C./hr.

(High-Temperature Holding Operation Phase)

The high temperature held at the high-temperature holding phase is appropriately determined in the range of 1,250 to 1,400° C.

The partial pressure of oxygen ($PO_2$) in the firing atmosphere at the high-temperature holding operation phase is set higher than the partial pressure value of oxygen found from the conventional equilibrium relation. That is, at this phase operation is carried out at a partial pressure of oxygen p2 that is higher than the value of equilibrium partial pressure of oxygen $PO_2$=p1 determined from an equilibrium relation to temperature on the basis of a basic operation equation $Log(PO_2)=a^*-b^*/T$ at the cooling operation phase to be described later: p2>p1. To put it another way, the partial pressure of oxygen p2 does not satisfy the aforesaid equilibrium relation (basic operation equation) in relation to the operating temperature.

By the incorporation of such operation, low core loss is achievable while high saturation flux density is maintained as ferrites are produced.

In the prior art in contrast to the invention, it is to be noted that the equilibrium partial pressure of oxygen $PO_2$=p1 determined from the equilibrium relation equation is used as such.

In the invention, the value of p2/p1 that is the ratio between p2 and p1 is in the range of 1.1 to 5.0, preferably 1.5 to 3.5. As this value of p2/p1 is below 1.1, it will have difficulty in achieving low core loss while maintaining high saturation flux density. As the value of p2/p1 exceeds 5.0, on the other hand, both high saturation flux density and low core loss will be less likely to be obtainable. Note here that the value of p1 determined from the equilibrium relation is usually in the range of 0.1 to 5%.

It is understood that the determination of the partial pressure oxygen at the high-temperature holding operation phase of the invention has close relations to the determination of the partial pressure of oxygen at the cooling operation phase to be described later: the understanding of part of the invention would go deeper by reference to the following explanation of the cooling operation phase.

(Cooling Operation Phase)

Referring to the operation of the partial pressure of oxygen and temperature at the cooling operation phase, the values of a and b are set to the given values a=a* and b=b* using the following equilibrium relation equation indicative of the equilibrium relation between the partial pressure of oxygen ($PO_2$ in %) and temperature (T in absolute temperature K):

$$Log(PO_2)=a-b/T \qquad \text{Eq. (1)}$$

Then, $Log(PO_2)=a^*-b^*/T$ that is a basic relation equation for the operation of the partial pressure of oxygen ($PO_2$) and temperature (T) is fixed as a basic equation for operation, so that the partial pressure of oxygen ($PO_2$) at the cooling operation phase is operated at an equilibrium partial pressure of oxygen determined in equilibrium relation to temperature based on the basic equation: $Log(PO_2)=a^*-b^*/T$.

The cooling rate is desirously in the range of 30 to 150° C./hr, especially 50 to 100° C./hr. In the temperature range of 1,000 down to 800° C. at the cooling operation phase, however, operation is preferably carried out at a cooling rate of at least 200° C./hr. This is because as the cooling rate is slow in this temperature range, there is a tendency for core loss toward growing large due to a solid solution form of re-dissolution that occurs with the use of Nb.

In contrast to the cooling operation phase explained here, it is restated by way of precaution that for the aforesaid partial pressure of oxygen ($PO_2$) at the high-temperature holding operation phase, the value of equilibrium partial pressure of oxygen $PO_2$=p1 is not directly used, as determined from the equilibrium relation to temperature based on the basic equation for operation $Log(PO_2)=a^*-b^*/T$; operation is carried out at the partial pressure of oxygen p2 that is higher than the value of the equilibrium partial pressure of oxygen $PO_2$=p1: p2>p1.

How to figure out the aforesaid basic equation for operation $Log(PO_2)=a^*-b^*/T$ is set out below.

(How to Figure out the Basic Equation for Operation $Log(PO_2)=a^*-b^*/T$)

The method of fixing the aforesaid basic equation for operation $Log(PO_2)=a^*-b^*/T$ comprises (i) a first step of working out as the value of b one value b* chosen from the range of 8,000 to 18,000, preferably 10,000 to 14,000, (ii) a second step of, on the assumption that as the value of a is fixed, it permits the relation of temperature to the partial pressure of oxygen to be found from equilibrium relation equation (1), varying the value of a between 3 and 14, preferably 4 and 10 at n points (where n is an integer in the range of 2 to 20) to figure out n equilibrium relation equations indicative of equilibrium relations of temperature to the partial pressure of oxygen corresponding to individual values a1, a2, a3, . . . , an, (iii) a third step where in the aforesaid n equilibrium relation equations, the temperature at the high-temperature holding operation phase and the decreasing temperature at the cooling operation phase are defined to find equilibrium partial pressures of oxygen corresponding to the operation of temperature at the high-temperature holding operation phase and cooling operation phase based on the n equilibrium relation equations (1), and (iv) a fourth step where preliminary experimentation is carried out to fire ferrites under the aforesaid n conditions to find a=am (where m is one chosen from m=1 to n) at which the ferrite is judged to have primarily an excellent saturation flux density property Bs, thereby fixing this am as a*. By such a method, the basic equation for operation $Log(PO_2)=a*-b*/T$ is fixed. At the first step of fixing b*, while the composition, size and shape of a core, the structure of a firing furnace, etc. are taken into account, experimentation is carried out such that high properties are obtainable.

In the aforesaid fourth step, the phrase "judged to have primarily an excellent saturation flux density property Bs" implies that in addition to the condition under which the highest saturation flux density Bs is obtainable, conditions near the highest saturation flux density Bs (within 95% or more of the highest saturation flux density Bs) may be fixed while taking the value of core loss into account by way of comparisons of properties.

With reference to Table 1 given below, how to figure out the basic equation for operation $Log(PO_2)=a*-b*/T$ will be specifically explained.

In Table 1, the first column positioned on the leftmost side is indicative of an atmospheric temperature Temp. in ° C. The next second column is indicative of the value of 1/T with the unit of T being absolute temperature (K).

In Table 1, alphabet and figure combinations except the numerical values of temperature are indicative of any chosen numerical values (x1~x13, y1), and numerical values worked out by calculation from the equilibrium relation equations (d1~d31; e1~e31; f1~31; g1~g31; h1~h31; i1~i31; j1~j31; k1~k31; L1~L31; m1~m31; n1~n31; o1~o31; p1~p31). Note here that x1>x2>x3> ... >x13.

The alphabet and figure combinations x1~x13 represented as the values of a (a:) and y1 represented as the value of b (b:) on the upper margin of Table 1 are the values of a and b in the equilibrium relation equation (1).

Numerical values indicated at the uppermost row in Table 1 are indicative of the equilibrium partial pressure of oxygen $PO_2$ at the holding temperature during firing. As an example, one at the holding temperature of 1,325° C. is exemplified; however, it may just as well be found at other temperatures.

With reference to Table 1 here, how to figure out the basic equation for operation $Log(PO_2)=a*-b*/T$ is now specifically explained.

(i) Based on the first step, b=b*=y1 is set while the composition, size and shape, the firing furnace, etc. are taken into account, as already mentioned.

TABLE 1

Representation for fixing PO2
$Log\ PO_2 = a - b/Temp.\ (K)$

| Temp. | 1/Temp. (K) | a: x1 y1 | x2 y1 | x3 y1 | x4 y1 | x5 y1 | x6 y1 | x7 y1 | x8 y1 | x9 y1 | x10 y1 | x11 y1 | x12 y1 | x13 y1 |
|---|---|---|---|---|---|---|---|---|---|---|---|---|---|---|
| | | d9 | e9 | f9 | g9 | h9 | i9 | j9 | k9 | L9 | m9 | n9 | o9 | p9 |
| 1400 | 5.977E-04 | d1 | e1 | f1 | g1 | h1 | i1 | j1 | k1 | L1 | m1 | n1 | o1 | p1 |
| 1390 | 6.013E-04 | d2 | e2 | f2 | g2 | h2 | i2 | j2 | k2 | L2 | m2 | n2 | o2 | p2p |
| 1380 | 6.050E-04 | d3 | e3 | f3 | g3 | h3 | i3 | j3 | k3 | L3 | m3 | n3 | o3 | p3 |
| 1370 | 6.086E-04 | d4 | e4 | f4 | g4 | h4 | i4 | j4 | k4 | L4 | m4 | n4 | o4 | p4 |
| 1360 | 6.124E-04 | d5 | e5 | f5 | g5 | h5 | i5 | j5 | k5 | L5 | m5 | n5 | o5 | p5 |
| 1350 | 6.161E-04 | d6 | e6 | f6 | g6 | h6 | i6 | j6 | k6 | L6 | m6 | n6 | o6 | p6 |
| 1340 | 6.200E-04 | d7 | e7 | f7 | g7 | h7 | i7 | j7 | k7 | L7 | m7 | n7 | o7 | p7 |
| 1330 | 6.238E-04 | d8 | e8 | f8 | g8 | h8 | i8 | j8 | k8 | L8 | m8 | n8 | o8 | p8 |
| 1325 | 6.258E-04 | d9 | e9 | f9 | g9 | h9 | i9 | j9 | k9 | L9 | m9 | n9 | o9 | p9 |
| 1320 | 6.277E-04 | d10 | e10 | f10 | g10 | h10 | i10 | j10 | k10 | L10 | m10 | n10 | o10 | p10 |
| 1315 | 6.297E-04 | d11 | e11 | f11 | g11 | h11 | i11 | j11 | k11 | L11 | m11 | n11 | o11 | p11 |
| 1310 | 6.317E-04 | d12 | e12 | f12 | g12 | h12 | i12 | j12 | k12 | L12 | m12 | n12 | o12 | p12 |
| 1300 | 6.357E-04 | d13 | e13 | f13 | g13 | h13 | i13 | j13 | k13 | L13 | m13 | n13 | o13 | p13 |
| 1290 | 6.398E-04 | d14 | e14 | f14 | g14 | h14 | i14 | j14 | k14 | L14 | m14 | n14 | o14 | p14 |
| 1280 | 6.439E-04 | d15 | e15 | f15 | g15 | h15 | i15 | j15 | k15 | L15 | m15 | n15 | o15 | p15 |
| 1275 | 6.460E-04 | d16 | e16 | f16 | g16 | h16 | i16 | j16 | k16 | L16 | m16 | n16 | o16 | p16 |
| 1270 | 6.481E-04 | d17 | e17 | f17 | g17 | h17 | i17 | j17 | k17 | L17 | m17 | n17 | o17 | p17 |
| 1260 | 6.523E-04 | d18 | e18 | f18 | g18 | h18 | i18 | j18 | k18 | L18 | m18 | n18 | o18 | p18 |
| 1250 | 6.566E-04 | d19 | e19 | f19 | g19 | h19 | i19 | j19 | k19 | L19 | m19 | n19 | o19 | p19 |
| 1225 | 6.676E-04 | d20 | e20 | f20 | g20 | h20 | i20 | j20 | k20 | L20 | m20 | n20 | o20 | p20 |
| 1200 | 6.789E-04 | d21 | e21 | f21 | g21 | h21 | i21 | j21 | k21 | L21 | m21 | n21 | o21 | p21 |
| 1175 | 6.906E-04 | d22 | e22 | f22 | g22 | h22 | i22 | j22 | k22 | L22 | m22 | n22 | o22 | p22 |
| 1150 | 7.027E-04 | d23 | e23 | f23 | g23 | h23 | i23 | j23 | k23 | L23 | m23 | n23 | o23 | p23 |
| 1125 | 7.153E-04 | d24 | e24 | f24 | g24 | h24 | i24 | j24 | k24 | L24 | m24 | n24 | o24 | p24 |
| 1100 | 7.283E-04 | d25 | e25 | f25 | g25 | h25 | i25 | j25 | k25 | L25 | m25 | n25 | o25 | p25 |
| 1075 | 7.418E-04 | d26 | e26 | f26 | g26 | h26 | i26 | j26 | k26 | L26 | m26 | n26 | o26 | p26 |
| 1050 | 7.559E-04 | d27 | e27 | f27 | g27 | h27 | i27 | j27 | k27 | L27 | m27 | n27 | o27 | p27 |
| 1025 | 7.704E-04 | d28 | e28 | f28 | g28 | h28 | i28 | j28 | k28 | L28 | m28 | n28 | o28 | p28 |
| 1000 | 7.855E-04 | d29 | e29 | f29 | g29 | h29 | i29 | j29 | k29 | L29 | m29 | n29 | o29 | p29 |
| 950 | 8.177E-04 | d30 | e30 | f30 | g30 | h30 | i30 | j30 | k30 | L30 | m30 | n30 | o30 | p30 |
| 900 | 8.525E-04 | d31 | e31 | f31 | g31 | h31 | i31 | j31 | k31 | L31 | m31 | n31 | o31 | p31 |

(ii) Based on the second step, the values of a at n=13 in Table 1, viz., 13 values of a or a=x1~x13 are defined to prepare 13 equilibrium relation equations.

(iii) In the aforesaid 13 equilibrium relation equations based on the third step, the temperature at the high-temperature holding operation phase and the decreasing temperature at the cooling operation phase were defined to find the partial pressures of oxygen corresponding to the operations for temperature at the high-temperature holding operation phase and cooling operation phase. The results are set out in Table 1. The 13 columns (d1~d31; e1~e31; f1~f31; g1~g31; h1~h31; i1~i31; j1~j31; k1~k31; L1~L31; m1~m31; n1~n31; o1~o31; p1~p31) are for reference.

(iv) Based on the fourth step, specific preliminary experimentation was carried out under the aforesaid 13 conditions to fire ferrites, thereby finding the values of a at which they were judged to have primarily an excellent saturation flux density property Bs. Here, a=am=a*=x6 was set, and so was the basic equation for operation $Log(PO_2)=x6-y1/T$.

When, based on these, the high temperature held at the high-temperature holding operation phase in Table 1 is 1,325° C., the partial pressure value of oxygen found from the equilibrium relation equations is p1=i9(%) from Table 1. In the invention, however, the partial pressure of oxygen in the firing atmosphere at the high-temperature holding operation phase is operated at a partial pressure of oxygen higher than the conventional equilibrium partial pressure of oxygen p1=i9 (%) that is the partial pressure value of oxygen found from the conventional equilibrium relation, for instance, at p2=i4(%) in Table 1. However, the range of p2/p1=i4/i9=1.1~1.5 must be satisfied.

By the incorporation of such operation, low core loss is achievable while high saturation flux density is maintained as ferrites are produced. In the prior art in contrast to the invention, it is to be noted that the equilibrium partial pressure of oxygen $PO_2$=p1=i9% (see Table 1) determined from the equilibrium relation equation was used as such: p2/p1=i9/i9=1.0.

At the cooling operation phase here, the temperature goes gradually down from the temperature of 1,325° C. at the high-temperature holding operation phase. Specifically, for the operation of the partial pressure of oxygen and temperature at the cooling operation phase, the equilibrium relation is maintained in line with the basic equation for operation $Log(PO_2)=x6-y1/T$; the equilibrium partial pressure of oxygen p1=i9(%) at 1,325° C. is applied from the start of cooling operation, with a sudden change of the partial pressure of oxygen from p2=i4(%) at the high-temperature holding phase to p1=i9(%). Thereafter, as the temperature goes slowly down, the equilibrium partial pressure of oxygen indicated at the eighth column in Table 1 from the left is applied as such.

On the one hand in the invention, the partial pressure of oxygen is controlled relatively high at the high-temperature holding operation phase so that the dissolution in solid solution form of a grain boundary component into a ferrite phase is held back, and on the other hand, the equilibrium concentration of oxygen is controlled at the cooling operation phase to a level lower than that at the high-temperature holding operation phase, so that excessive Fe turns into $Fe_3O_4$ of stronger magnetism, which could control the concentration of $Fe_{2+}$. As a result, there could be a MnZn-base ferrite obtained that is well balanced between both saturation flux density and core loss: high saturation flux density and low core loss.

Example

The invention is now explained in further details with reference to some specific examples.

$Fe_2O_3$ powders, MnO powders, ZnO powders, NiO powders and $Li_2CO_3$ powder were readied up as the raw materials for the main ingredients, and $SiO_2$ powders, $CaCO_3$ powders, $ZrO_2$ powders and $Nb_2O_5$ powders as the raw materials for the subordinate ingredients.

The main ingredient raw materials were weighed in such a way as to have a main ferrite ingredient composition shown in Table 2 given below, mixed wet in a wet ball mill for 16 hours, and dried.

Then, the dried mixture was calcined in the atmosphere at 900° C. for 3 hours, and pulverized.

The subordinate ingredient raw materials were added to the resultant calcined powders in such a way as to have a subordinate ferrite ingredient composition shown in Table 2 given below, followed by mixing and pulverization. A binder was added to the resultant powder mixture for granulation, and the granules were compacted into a toroidal compact.

TABLE 2

| | Main ingredients | | | | | Subordinate ingredients (in wtppm relative to the main ingredients) | | | |
|---|---|---|---|---|---|---|---|---|---|
| Sample | Fe2O3 (mol %) | MnO (mol %) | ZnO (mol %) | LiO$_{0.5}$ (mol %) | NiO (mol %) | SiO$_2$ | CaCO$_3$ | Nb$_2$O$_5$ | ZrO$_2$ |
| A | 56.6 | 34.9 | 6.8 | 1.7 | — | 100 | 1100 | 250 | 100 |
| B | 58.1 | 32.2 | 5.7 | — | 4.0 | 130 | 1300 | 250 | 100 |
| C | 61.5 | 23.5 | 7.7 | — | 7.3 | 120 | 1250 | 250 | 100 |
| D | 55.0 | 35.4 | 9.6 | — | — | 90 | 950 | 250 | 100 |

Then, the obtained compact was fired under given conditions at the high-temperature holding operation phase and cooling operation phase, one each having a controlled partial pressure of oxygen as shown in Table 3 given below, to obtain a toroidal ferrite core. Ferrite core size was 20 mm in outer diameter, 10 mm in inner diameter, and 5 mm in thickness.

At the heating operation phase, the concentration of oxygen (the partial pressure of oxygen) in the atmosphere was set at 0% in the temperature range up to the high-temperature holding operation phase. The heating rate was 300° C./hr up to 900° C., and 100%/hr from 900° C. up to the temperature at the high-temperature holding operation phase.

At the cooling operation phase, the cooling rate was 75° C./hr from the temperature at the high-temperature holding operation phase down to 1,050° C., and 300° C./hr from 1,050° C. down to room temperature.

The obtained ferrite samples were measured in terms of saturation flux density Bs at 100° C. (at 1,194 A/m) and core loss Pcv (at 100 kHz and 200 mT). The results are set out in Table 3 given below.

In Table 3, samples B-1 to B-4 may be thought of as preliminary experimentation ones for fixing a=a* in particular when finding the basic equation for operation $Log(PO_2)=a^*-b^*/T$ with a ferrite composition B. Of samples

TABLE 3

| Sample No. | Ferrite CompoSition | Equilibrium relation equation b = b* | a | a* | Sintering temp. (° C.) | Partial pressure of oxygen p2 (%) at the high-temp. holding operation phase (for the sintering temp., see the column "sintering temp.") | Partial pressure of oxygen p1 (%) at the cooling operation phase (for the sintering temp., see the column "sintering temp.") | p2/p1 | Saturation flux density Bs (mT) | Core loss Pcv (kW/m³) |
|---|---|---|---|---|---|---|---|---|---|---|
| A-1 (Comp.) | A | 11900 | 8.1 |  | 1325 | 5.0 | 5.0 | 1 | 473 | 390 |
| A-2 (Comp.) | A | 11900 | 7.5 |  | 1325 | 2.0 | 2.0 | 1 | 475 | 382 |
| A-3 (Comp.) | A | 11900 | 7.2 |  | 1325 | 0.5 | 0.5 | 1 | 472 | 421 |
| A-4 (Comp.) | A | 11900 | 7.4 | 7.4 | 1325 | 1.0 | 1.0 | 1 | 477 | 390 |
| A-5 | A | 11900 |  | 7.4 | 1325 | 2.0 | 1.0 | 2 | 477 | 365 |
| A-6 | A | 11900 |  | 7.4 | 1325 | 3.0 | 1.0 | 3 | 478 | 352 |
| A-7 | A | 11900 |  | 7.4 | 1325 | 4.0 | 1.0 | 4 | 476 | 361 |
| A-8 | A | 11900 |  | 7.4 | 1325 | 5.0 | 1.0 | 5 | 476 | 379 |
| A-9 (Comp.) | A | 11900 |  | 7.4 | 1325 | 10.0 | 1.0 | 10 | 465 | 412 |
| A-10 (Comp.) | A | 11900 |  | 7.4 | 1325 | 0.5 | 1.0 | 0.5 | 471 | 468 |
| B-1 (Comp.) | B | 13000 | 9.0 |  | 1300 | 5 | 5 | 1 | 472 | 485 |
| B-2 (Comp.) | B | 13000 | 8.7 |  | 1300 | 2 | 2 | 1 | 481 | 472 |
| B-3 (Comp.) | B | 13000 | 8.3 |  | 1300 | 1 | 1 | 1 | 483 | 468 |
| B-4 (Comp.) | B | 13000 | 8.2 | 8.2 | 1300 | 0.8 | 0.8 | 1 | 484 | 462 |
| B-5 | B | 13000 |  | 8.2 | 1300 | 1 | 0.8 | 1.25 | 485 | 425 |
| B-6 | B | 13000 |  | 8.2 | 1300 | 2 | 0.8 | 2.5 | 487 | 412 |
| B-7 | B | 13000 |  | 8.2 | 1300 | 3 | 0.8 | 3.75 | 486 | 423 |
| B-8 | B | 13000 |  | 8.2 | 1300 | 4 | 0.8 | 5 | 482 | 456 |
| B-9 (Comp.) | B | 13000 |  | 8.2 | 1300 | 5 | 0.8 | 6.25 | 475 | 472 |
| B-10 (Comp.) | B | 13000 |  | 8.2 | 1300 | 0.5 | 0.8 | 0.625 | 471 | 667 |
| C-1 (Comp.) | C | 11900 | 8.1 | 8.1 | 1325 | 5 | 5 | 1 | 498 | 812 |
| C-2 (Comp.) | C | 11900 | 7.5 | 7.5 | 1325 | 2 | 2 | 1 | 510 | 753 |
| C-3 (Comp.) | C | 11900 | 7.2 | 7.2 | 1325 | 0.5 | 0.5 | 1 | 502 | 724 |
| C-4 (Comp.) | C | 11900 | 7.4 | 7.4 | 1325 | 1 | 1 | 1 | 510 | 732 |
| C-5 | C | 11900 |  | 7.4 | 1325 | 2 | 1 | 2 | 509 | 703 |
| C-6 | C | 11900 |  | 7.4 | 1325 | 3 | 1 | 3 | 511 | 689 |
| C-7 | C | 11900 |  | 7.4 | 1325 | 4 | 1 | 4 | 510 | 708 |
| C-8 | C | 11900 |  | 7.4 | 1325 | 5 | 1 | 5 | 507 | 720 |
| C-9 (Comp.) | C | 11900 |  | 7.4 | 1325 | 10 | 1 | 10 | 501 | 894 |
| D-1 (Comp.) | D | 11900 | 8.4 | 8.4 | 1310 | 8.5 | 8.5 | 1 | 438 | 423 |
| D-2 (Comp.) | D | 11900 | 8.2 | 8.2 | 1310 | 4.5 | 4.5 | 1 | 440 | 403 |
| D-3 (Comp.) | D | 11900 | 8 | 8 | 1310 | 3 | 3 | 1 | 443 | 400 |
| D-4 (Comp.) | D | 11900 | 7.4 | 7.4 | 1310 | 0.85 | 0.85 | 1 | 440 | 402 |
| D-5 | D | 11900 |  | 8 | 1310 | 4.5 | 3 | 1.5 | 445 | 371 |
| D-6 | D | 11900 |  | 8 | 1310 | 8.5 | 3 | 2.83 | 442 | 382 |
| D-7 | D | 11900 |  | 8 | 1310 | 15 | 3 | 5 | 438 | 394 |
| D-8 (Comp.) | D | 11900 |  | 8 | 1310 | 0.85 | 3 | 0.28 | 432 | 505 |

In Table 3, samples A-1 to A-4 may be thought of as preliminary experimentation ones for fixing a=a* in particular when finding the basic equation for operation $Log(PO_2)=a^*-b^*/T$ with a ferrite composition A. Of samples A-1 to A-4, data on sample A-4 having the highest saturation flux density is used to fix a=a*=7.4. Then, samples A-5 to A-10 are prepared to make an estimation of whether their values of saturation flux density Ba and core loss Pcv are good or bad using the data on sample A-4 as a reference value. From the results set out in Table 3, it is found that with the invention, the core loss Pcv can be more reduced while the saturation flux density Bs is maintained at a high value in the range of p2/p1=1.5 to 1.5, as compared with a typical conventional method for sample A-4.

B-1 to B-4, data on sample B-4 having the highest saturation flux density is used to fix a=a*=8.2. Then, samples B-5 to B-10 are prepared to make an estimation of whether their values of saturation flux density Ba and core loss Pcv are good or bad using the data on sample B-4 as a reference value. From the results set out in Table 3, it is found that with the invention, the core loss Pcv can be more reduced while the saturation flux density Bs is maintained at a high value in the range of p2/p1=1.25 to 5.0, as compared with a typical conventional method for sample B-4.

In Table 3, samples C-1 to C-4 may be thought of as preliminary experimentation ones for fixing a=a* in particular when finding the basic equation for operation $Log(PO_2)=a^*-b^*/T$ with a ferrite composition C. Of samples C-1 to C-4, data on sample C-4 having the highest saturation flux density is used to fix a=a*=7.4. Then, samples C-5 to C-9 are prepared to make an estimation of whether their values of saturation flux density Ba and core loss Pcv are good or bad using the data on sample C-4 as a reference value. From the results set out in Table 3, it is found that with the invention, the core loss Pcv can be more reduced while the saturation flux density Bs is maintained at a high value in the range of p2/p1=2.0 to 5.0, as compared with a typical conventional method for sample C-4.

In Table 3, samples D-1 to D-4 may be thought of as preliminary experimentation ones for fixing a=a* in particular when finding the basic equation for operation $Log(PO_2)$ =a*−b*/T with a ferrite composition D. Of samples DB-1 to D-4, data on sample D-3 having the highest saturation flux density is used to fix a=a*=8.0. Then, samples D-5 to D-8 are prepared to make an estimation of whether their values of saturation flux density Ba and core loss Pcv are good or bad using the data on sample D-4 as a reference value. From the results set out in Table 3, it is found that with the invention, the core loss Pcv can be more reduced while the saturation flux density Bs is maintained at a high value in the range of p2/p1=1.5 to 5.0, as compared with a typical conventional method for sample D-4.

From the aforesaid results of experimentation, the advantages of the invention would be undisputed.

That is, the invention provides a MnZn-base ferrite production process comprising a firing step for firing a compact into a ferrite, wherein said firing step comprises a heating operation phase, a high-temperature holding operation phase and a cooling operation phase in order; said heating operation phase is an operation area for bringing a firing temperature from room temperature gradually up to the highest temperature; said high-temperature holding operation phase is an operation area for allowing the reached highest temperature to remain held for a given time; said cooling operation phase is an operation area for bringing the reached highest temperature gradually down to near room temperature; for operation of a partial pressure of oxygen and temperature at said high-temperature holding operation phase and said cooling operation phase, the following equilibrium relation equation (1) indicative of an equilibrium relation of a partial pressure of oxygen ($PO_2$ in %) to a temperature (T in absolute temperature K) is used to set the values of a and b at given values of a=a* and b=b*, respectively, $$Log(PO_2)=a-b/T \qquad Eq. (1)$$

and $Log(PO_2)=a*-b*/T$ that is a basic relation equation for operation of the partial pressure oxygen ($PO_2$) and temperature (T) is determined as an basic equation for operation; the partial pressure of oxygen ($PO_2$) at said high-temperature holding operation phase is operated at a partial pressure of oxygen p2 that is higher than the value of an equilibrium partial pressure of oxygen $PO_2$=p1 determined from an equilibrium relation to temperature based on the basic equation for operation $Log(PO_2)=a*-b*/T$: p2>p1; and the partial pressure of oxygen ($PO_2$) at said cooling operation phase is operated at an equilibrium partial pressure of oxygen determined from an equilibrium relation to temperature based on the basic equation $Log(PO_2)=a*-b*/T$. It is thus possible to obtain a MnZn-base ferrite having well-balanced properties: high saturation flux density and low core loss.

INDUSTRIAL APPLICABILITY

The MnZn-base ferrite production process of the invention may find wide applications in the electric parts industry.

What we claim is:

1. A process for producing a MnZn-base ferrite comprising:
    firing a compacted raw material to produce the MnZn-base ferrite,
    wherein said firing comprises, in the following order:
    a heating phase comprising gradually bringing a firing temperature from room temperature up to a maximum temperature;
    a maximum temperature holding phase comprising maintaining the maximum temperature for a period of time, wherein a partial pressure of oxygen (p2) at said maximum temperature holding phase is greater than an equilibrium partial pressure of oxygen (p1) as follows:

p2>p1 wherein the equilibrium partial pressure of oxygen (p1) is represented by the following equation:

$log(p1)=log(PO_2)=a-b/T$ wherein $PO_2$ is measured in a unit of %, a has a value of from 3 to 14, b has a value of from 8,000 to 18,000, and T is measured in a unit of absolute temperature K; and
    a cooling phase comprising gradually bringing the maximum temperature down to near room temperature, wherein a partial pressure of oxygen (p3) at said cooling phase is operated at an equilibrium partial pressure of oxygen based on the equation $log(p3)=a-b/T$.

2. The process for producing a MnZn-base ferrite according to claim 1, wherein the ratio of p2/p1 is 1.1-5.0.

3. The process for producing a MnZn-base ferrite according to claim 1, wherein the ratio of p2/p1 is 1.5-3.5.

4. The process for producing a MnZn-base ferrite according to claim 1, wherein an atmosphere having an oxygen concentration of 10% or less is maintained during said heating phase at a temperature of from 900° C. up to the maximum temperature of said maximum temperature holding phase.

5. The process for producing a MnZn-base ferrite according to claim 1, wherein an atmosphere having an oxygen concentration of 3% or less is maintained during said heating phase at a temperature of from 600° C. up to the maximum temperature of said maximum temperature holding phase.

6. The process for producing a MnZn-base ferrite according to claim 1, wherein an atmosphere having an oxygen concentration of 0% is maintained during said heating phase up to the maximum temperature of said maximum temperature holding phase.

7. The process for producing a MnZn-base ferrite according to claim 1, wherein said heating phase is carried out at a heating rate of 50-300° C./hour up to the maximum temperature of said maximum temperature holding phase.

8. The process for producing a MnZn-base ferrite according to claim 1, wherein the maximum temperature at said maximum temperature holding phase is 1,250-1,400° C.

9. The process for producing a MnZn-base ferrite according to claim 1, wherein an atmosphere is changed to a nitrogen atmosphere at a temperature of 1,100-900° C. during said cooling phase.

10. The process for producing a MnZn-base ferrite according to claim 1, wherein said cooling phase is carried out at a cooling rate of greater than 200° C./hour at a temperature of 1,000-800° C.

11. The process for producing a MnZn-base ferrite according to claim 1, wherein said process further comprises in the following order and prior to said firing:

weighing a raw material powder;

mixing the raw material powder that has been weighed to produce a raw material powder mixture;

calcining the raw material powder mixture to produce a calcined raw material;

pulverizing the calcined raw material to produce a pulverized raw material powder;

granulating the pulverized raw material powder to produce a granulated raw material; and compacting the granulated raw material to produce a compacted raw material.

12. The process for producing a MnZn-base ferrite according to claim 1, wherein the MnZn-base ferrite comprises, as main ingredients:

55-61.5 mole % $Fe_2O_3$;

4-15 mole % ZnO; and a balance predominantly comprising MnO.

13. The process for producing a MnZn-base ferrite according to claim 12, wherein the MnZn-base ferrite further comprises, as a main ingredient:

2.5-7.5 mole % NiO.

14. The process for producing a MnZn-base ferrite according to claim 12, wherein the MnZn-base ferrite comprises, as a main ingredient:

0.5-2.0 mole % $Li_2O$.

15. The process for producing a MnZn-base ferrite according to claim 12, wherein the MnZn-base ferrite comprises, as a subordinate ingredient, as least one element selected from the group consisting of Si, Ca, Zr, Nb, Ta, V, Bi, Mo and Sn.

16. The process for producing a MnZn-base ferrite according to claim 1, wherein the MnZn-base ferrite comprises, as main ingredients:

55-59 mole % $Fe_2O_3$;

5-10 mole % ZnO; and a balance predominantly comprising MnO.

17. The process for producing a MnZn-base ferrite according to claim 16, wherein the MnZn-base ferrite comprises, as a main ingredient:

3-6 mole % NiO.

18. The process for producing a MnZn-base ferrite according to claim 16, wherein the MnZn-base ferrite comprises, as a main ingredient:

1.0-1.5 mole % $Li_2O$.

19. The process for producing a MnZn-base ferrite according to claim 16, wherein the MnZn-base ferrite comprises at least one subordinate ingredient selected from the group consisting of $SiO_2$, CaO, $ZrO_2$, $Nb_2O_3$, $Ta_2O_5$, $V_2O_5$, $Bi_2O_3$ and $MoO_3$.

20. The process for producing a MnZn-base ferrite according to claim 16, wherein the MnZn-base ferrite comprises at least one subordinate ingredient selected from the group consisting of:

0.005-0.03 wt. % $SiO_2$;

0.008-0.17 wt. % CaO;

0.005-0.03 wt. % $ZrO_2$;

0.005-0.03 wt. % $Nb_2O_3$;

0.01-0.1 wt. % $Ta_2O_5$;

0.01-0.1 $V_2O_5$;

0.005-0.04 wt. % $Bi_2O_3$; and 0.005-0.04 wt. % $MoO_3$.

* * * * *